Dec. 12, 1939.   F. E. BRADY   2,183,421

FLUID PRESSURE SYSTEM

Filed Oct. 5, 1935

Inventor
Francis E. Brady
By Maréchal & Noe
Attorney

Patented Dec. 12, 1939

2,183,421

UNITED STATES PATENT OFFICE 2,183,421

FLUID PRESSURE SYSTEM

Francis E. Brady, Connersville, Ind.

Application October 5, 1935, Serial No. 43,710

18 Claims. (Cl. 103—6)

This invention relates to fluid pressure apparatus and more particularly to fluid pressure systems incorporating a liquid tank or the like for maintaining a quantity of liquid under a predetermined pressure.

One object of the invention is the provision of a single and reliable fluid pressure system having means for automatically maintaining a predetermined liquid level in the liquid supply tank.

Another object of the invention is the provision of an air supply chamber adapted to automatically replenish air absorbed by the liquid in a liquid tank, one wall of the chamber being moved in accordance with the pressure existing in the inlet side of the liquid supply pump so that each time the pump runs a charge of outside air is injected into the tank if the liquid level in the tank is too high.

Another object is the provision of air replenishing means for a tank, having restricted communication with the tank at the desired liquid level and adapted when operated, to pump air into the tank if the liquid level of the tank is above the point of restricted communication.

Other objects and advantages of the invention will be apparent from the following description, the appended claims, and the accompanying drawing in which—

Figure 2:
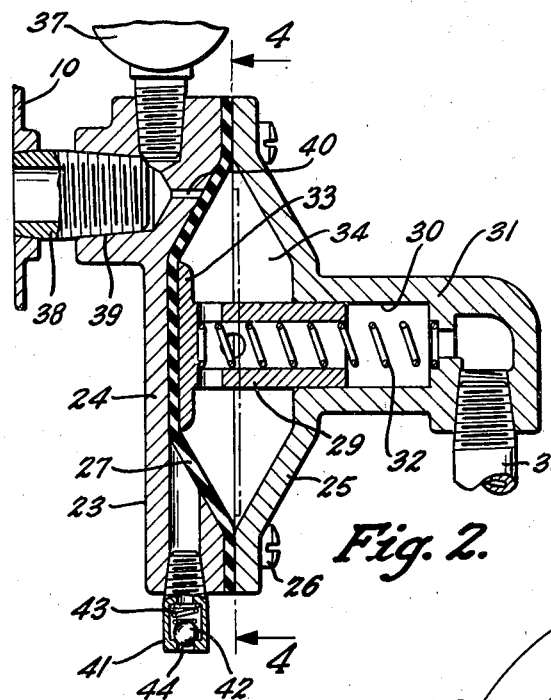
Fig. 2 is a central vertical section through the air-replenishing means.

In fluid pressure systems a fluid pressure tank is frequently used to receive liquid from a pump or the like, and to store the liquid under predetermined pressure conditions. In such systems, where the liquid is water or the like capable of absorbing the air or other gas which forms an expansible cushion over the top of the liquid, it is found that the liquid level tends to rise, portions of the air or other gas over the liquid being absorbed by the liquid. If the amount of gas over the liquid is small the capacity for the storage of pressure is also small so it is quite desirable to maintain the liquid level at some predetermined position or range of positions, and to replenish the air absorbed by the liquid or otherwise lost, in order to maintain a comparatively large air cushion in the tank.

In accordance with the present invention, and as shown in the accompanying drawing to which reference is made by reference numerals, the air in a pressure tank is maintained substantially constant in an automatic manner and with mechanism of very simple construction. 10 designates the pressure tank, which is supplied with water or other liquid from the pipe 11 leading from the discharge side of the liquid pump 12. The liquid is supplied to the pump 12 through a suction pipe 13, preferably having a check valve 14. The pump 12 may be operated by an electric motor 15 or the like, and is preferably a constant discharge type of pump such as a centrifugal turbine pump construction.

In accordance with the usual pressure tank arrangement, the motor 15 is energized by an automatic switch 16 controlled by a fluid pressure regulator 17 which is in communication with the interior of the tank 10 by means of pipe 18. If the pressure within the tank 10 falls below predetermined limit, the switch 16 is automatically closed, and remains closed until the pressure is built up to an upper predetermined pressure limit, the switch 16 of course serving to connect the motor 15 to a suitable source of current.

Figure 1:
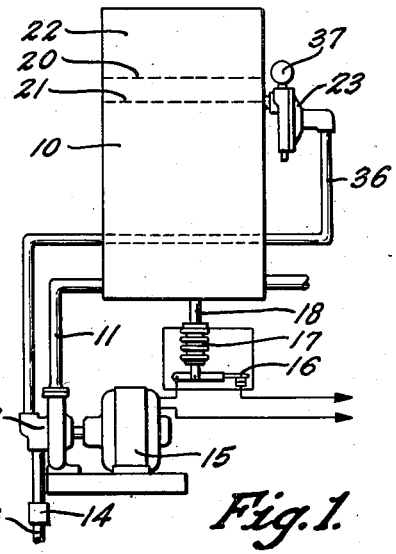
Fig. 1 is a diagrammatic view showing a fluid pressure system embodying the present invention.

Reference numerals 20 and 21, in Fig. 1, indicate the upper and lower liquid levels, the lower line 21 being the level of the top of the liquid corresponding to the lower pressure limit. In other words when the pressure of the tank 10 falls low enough to start the motor 15 operating, the liquid in the tank will be at the line 21 when the normal air supply is present in the tank. The height of this line is so chosen so as to give a comparatively large air cushion or space 22 above the level of the liquid while at the same time providing for the storage of a comparatively large amount of liquid in the tank.

Figure 3:
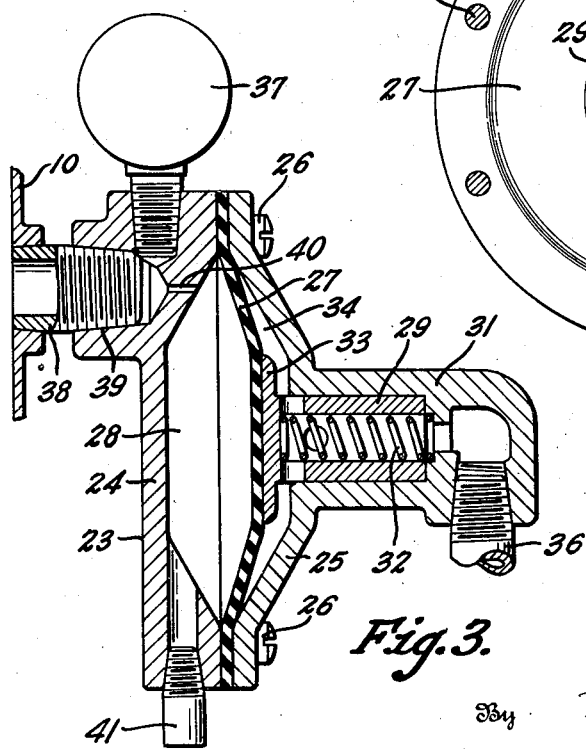
Fig. 3 is a sectional view corresponding to Fig. 2 but showing the piston in its retracted position.
Figure 4:
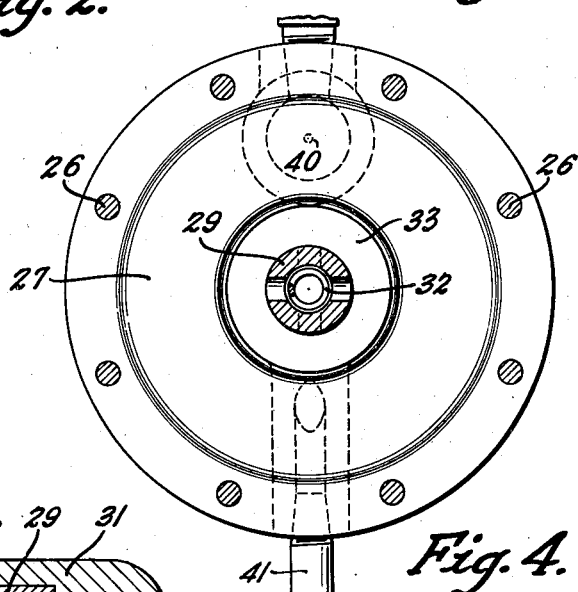
Fig. 4 is a vertical section on the line 4—4 of Fig. 2.

When the liquid level rises due to air absorption, the air is replenished automatically, to restore the desired level of the liquid to the line 21 by means of an air supply device which is shown in section in Fig. 2. The air supply device comprises a casing 23, preferably constructed of the two casing walls 24 and 25 bolted together by screws or bolts 26. Between the two casing walls 24 and 25 is a flexible diaphragm or piston wall 27, forming a movable wall of the chamber 28. Attached to the diaphragm 27 is a plunger 29 which is slidably mounted in a bore 30 provided in the extension portion 31 of the casing 25. A spring 32 bearing against the head 33 of the plunger 29 normally urges the plunger to the left as shown in Fig. 2. However when the right hand side of the wall 27 is subjected to suction, the wall 27 is moved to the position shown in Fig. 3. This suction is applied to the space 34 at the right hand side of the flexible wall by means of the pipe 36, which extends down to the suction side of the pump 12. Each time the pump is started, the suction side of the pump is subjected to a rather high degree of suction, since the liquid in the pipe 13 is at that time stationary. This suction created on the suction side of the pump just at the time the pump starts is sufficient to overcome the action of the spring 32 and draws the plunger 29 to the right. When the suction decreases after the pump stops, and the pressure on the inlet and outlet sides of the pump is more or less equalized, the spring 32 urges the flexible wall back to its original position as shown in Fig. 2.

The casing 23 is attached to the tank 10 by a pipe section 38 which is secured in a threaded passage 39, which is in communication with a pressure gage 37. At the end of this passage 38 is a restricted hole or passage 40 which places the interior of the tank 10 in restricted communication with the chamber 28. The passage 40 is small enough to offer a comparatively high resistance to the rapid flow of water through it, although air or other gas can move through the passage rapidly enough when the wall 27 is moved to the right to prevent a high degree of suction in the chamber 28. This chamber is also in communication with the outside air through a check valve 41, shown as including a ball check 42 and a spring 43 which normally holds the ball tightly against the opening 44. The spring 43 is strong enough to hold the opening 44 closed when the diaphragm 27 is moved to the right if at the same time there is a flow of air through the restricted passage 40 from the tank to the chamber 28. This occurs if there is sufficient air in the space 22 over the liquid, and in such event the operation of the diaphragm 27 each time the pump runs merely serves to draw air from the tank into the chamber 28 and then force the air back into the tank again without adding additional air from the outside. If, however, the liquid level in the tank is above the line 21 when the pump starts, it is then desirable to add more air to the tank to restore this liquid level 21; and under these circumstances, this addition of the air automatically occurs because when the diaphragm 27 is moved over to the right air will be drawn into the chamber 28 through check valve 41, since the restriction offered by the passage 40 is too great for the rapid flow of water through that passage, and consequently sufficient suction is developed to overcome the tension of spring 43. This charge of air drawn into the chamber 28, together with whatever water leaks in slowly through the passage 40 will then be injected into the tank 10 when the pump stops, by means of the spring 32.

It will thus be seen that the amount of air in the tank will be maintained substantially constant, and will be maintained without requiring the attention of the operator. As herein shown the air replenishing device is operated by connection to the suction side of the pump, but other arrangements may of course be employed so as to insure the operation of the diaphragm 27 each time the pump performs an operating cycle.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a fluid pressure system of the character described, a tank, means for supplying liquid under pressure to said tank, means for replenishing air absorbed by the liquid in the tank to maintain the desired liquid level in the tank comprising a chamber having a restricted communication with the tank at the desired liquid level, a check valve providing passage of air to said chamber, and means for changing the volume of said chamber to force air therefrom into said tank.

2. In a fluid pressure system of the character described, a tank, a pump for supplying liquid to said tank, and means for maintaining a substantially constant quantity of air above the liquid in the tank to maintain the desired liquid level in the tank comprising a chamber having a restricted passage communicating with the tank at the desired liquid level, means for changing the capacity of said chamber, and a valve providing for air flow to said chamber when the chamber is subjected to a predetermined degree of suction.

3. In a fluid pressure system of the character described, a tank, a pump for supplying liquid to said tank, and means for maintaining a substantially constant quantity of air above the liquid in the tank to maintain the desired liquid level in the tank comprising a chamber having a restricted passage communicating with the tank at the desired liquid level, means for changing the capacity of said chamber, and a valve providing for air flow to said chamber when the chamber is subjected to a predetermined degree of suction, the restriction of said passage being so coordinated with the pressure at which the valve operates as to prevent admission of air into said chamber through said valve when air enters the chamber through said restricted passage.

4. In a fluid pressure system of the character described, a tank, means for supplying liquid under pressure to said tank, and means for replenishing air absorbed by liquid in the tank to maintain the desired liquid level in the tank, comprising a chamber having a restricted passage communicating with the tank at the desired liquid level, a check valve for flow of air to said chamber below a predetermined chamber pressure, said chamber having a piston wall movable to vary the capacity of the chamber, means for applying suction to one side of said piston wall, and spring means for returning the piston wall to force air from said chamber into said tank.

5. In a fluid pressure system of the character described, a tank, a pump for supplying liquid to said tank, means for replenishing air absorbed by the liquid in the tank to maintain the desired liquid level in the tank comprising a chamber having a movable wall and having restricted communication with the tank at the desired liquid level, a check valve providing passage of air to said chamber from the exterior, means for placing said movable wall in communication with the inlet side of said pump for operation of said wall each time the pump starts, and means for automatically starting the pump when the pump pressure falls to a predetermined limit.

6. In a fluid pressure system of the character described, a tank, a pump having a substantially constant delivery pressure for supplying liquid to said tank to maintain the desired liquid level in the tank, a chamber having a restricted communication with said tank at the desired liquid level, means including a movable wall for forcing air from said chamber into said tank, and means for operating the said wall in accordance with the pressure on the suction side of the pump.

7. In a fluid pressure system of the character described, a pressure tank, a liquid pump for supplying liquid to said tank, an air pump having a displacement member and adapted to supply air to said tank, said displacement member being normally urged in one direction, and connections between said liquid pump and said air pump providing for using the suction of said liquid pump to move said displacement member in a direction opposed to that in which it is normally urged.

8. In a fluid pressure system of the character described, a tank, a pump for supplying liquid to said tank, and means for supplying air to said tank to maintain a predetermined liquid level, said last named means comprising a chamber having a displacement member operable to draw into said chamber and force to said tank a charge of air of substantially constant volume for each operation of said displacement member, said chamber having a passage communicating with the outside air for the supply of air, at times, to said chamber and having a second passage communicating with the tank and automatically effective in accordance with the level of liquid in the tank to control whether said charge of air comes from said first or said second passage, and means for operating said displacement member.

9. In a fluid pressure system of the character described, a pressure tank, means for supplying liquid under pressure to said tank, an air chamber having a passage communicating with the outside air through which air, at times, is supplied to said chamber, said chamber having a displacement member operable to draw air into said chamber and to force air from said chamber into said tank, a passage extending from said chamber to the tank through which air is supplied, at times, from said tank to said chamber and automatically controlled by the liquid inside said tank in accordance with the level thereof determining whether the air drawn into said chamber comes from the first or second passage, and means for operating said displacement member.

10. In a fluid pressure system of the character described, a reservoir tank, an intermittently operable liquid pump operable through an operating cycle to supply liquid to said tank, means for initiating an operating cycle of said liquid pump when the pressure of the liquid in the tank falls below a predetermined minimum, air supply means for supplying air to said tank to maintain a predetermined liquid level, said air supply means comprising a reciprocally movable air displacement member performing a single air supplying stroke and a single suction stroke each time said liquid pump operates, means effective in accordance with the liquid level in said tank for causing said air supply means to add air to the tank only when the liquid is above a predetermined level in the tank, and means for operating the displacement member each time the pump is started.

11. In a fluid pressure system of the character described, a pressure tank, a pump for supplying liquid under pressure to said tank, an air chamber having a passage communicating with the outside air through which air, at times, is supplied to said chamber, a check valve in said passage preventing reverse flow of air, a passage extending from said chamber to the tank and communicating with the tank at the desired normal liquid level in the tank, said passage being adapted to supply air from the tank to the chamber when the liquid level in the tank is below the normal level so that the flow of air to said chamber comes from either said first or said second passage in accordance with the level of liquid in the tank, and means for subjecting said chamber to the suction of the pump inlet each time the pump is started.

12. In a fluid pressure system of the character described, a pressure tank for storing liquid, a liquid pump for supplying liquid to said tank to maintain a desired liquid level in the tank, means for automatically controlling the pump in accordance with the pressure in the tank to maintain a predetermined tank pressure, an air pump having a displacement member, spring means yieldingly urging said displacement member in one direction, said air pump having a passage extending to said tank adapted to supply air to said tank, and a passage communicating at one end with the displacement member of the air pump and at its other end with the liquid pump for operating said displacement member against the pressure of said spring means when the liquid pump starts.

13. In combination with a unit water supply system having a water pressure pump, an actuating means for the pump, a pressure water and air tank, and a pressure controlled means for starting and stopping said water pump, of an auxiliary air pump having an atmospheric inlet, and a discharge tube into the pressure tank, including means associated with said discharge tube responsive to the level of water in said tank for controlling the intake of air to the air pump from the atmosphere.

14. In combination with a unit water supply system having a water pressure pump, an actuating means for the pump, a pressure water and air tank, and a pressure controlled means for starting and stopping said water pump, of an auxiliary air pump having an atmospheric inlet, and a discharge tube into the pressure tank including a capillary nozzle in said discharge tube adapted to permit the intake of atmospheric air into said auxiliary air pump only when said nozzle is submerged in the water in the tank, said auxiliary pump being actuated by the change in hydraulic pressure on the suction side of the water pump when operating and when at rest.

15. A device for maintaining the liquid level in a tank containing liquid and air under pressure and including an intermittently operated pump for liquids maintained when at rest under the same liquid pressure as the tank, said device adapted to be actuated by the change in pressure on the suction side of the pump when it is in operation and when it is at rest, comprising a casing, a partition diaphragm within said casing, means within said casing on one side for displacing said diaphragm, a discharge duct in the casing on the other side of said diaphragm to the tank, an atmospheric inlet to said duct, means associated with said discharge duct for admitting to the casing space on the side of the diaphragm adjacent the discharge duct through said duct liquid from the tank and air from the atmosphere when the liquid level in the tank is too high and for admitting to said casing space only air from the tank when the liquid level in the tank is too low, and pipe means for hydraulically connecting the space between the casing and the diaphragm on the side opposite the duct to the liquid in the suction side of said pump.

16. A device for maintaining the liquid level in a tank containing liquid and air under pressure and including a pump for liquids maintained when at rest under the same liquid pressure, said device adapted to be actuated by the change of pressure on the suction side of the pump when it is in operation and when it is stopped, comprising a casing, a flexible diaphragm partition in said casing, spring means on one side of said diaphragm to displace said diaphragm partition, hydraulic means within the casing on the same side of the partition as the spring means for moving said diaphragm operatively communicating with the liquid on the suction side of said pump, a discharge duct for the space on the opposite side of said diaphragm partition, an elongated nozzle in said duct and an air inlet valve communicating with said space.

17. A device for maintaining the liquid level in a tank containing liquid and air under pressure and including a pump for liquids maintained when not operating under the same liquid pressure, said device adapted to be actuated by the change of pressure on the suction side of the pump when it is in operation and when it is stopped, comprising a casing, a flexible diaphragm partition in said casing, spring means within said casing to displace said diaphragm partition, hydraulic means within the casing on the same side of the partition as the spring means for moving said diaphragm partition operatively communicating with the liquid on the suction side of said pump, a discharge duct for the space on the opposite side of said diaphragm partition, a nozzle in said duct adapted to be inserted within the pressure tank at the desired water level, and a spring controlled sniffer valve communicating with said space.

18. In a water supply system, a storage tank, means including a pump for supplying water to said tank, means defining a chamber having an air inlet valve adjacent said tank and having a connection with said tank for the passage of air, said chamber having communication with said pump for the creation of a vacuum therein for allowing air from said tank to enter said chamber when the pump starts to operate at a time when the level of the water in said tank is below said connections.

FRANCIS E. BRADY.